United States Patent

Iversen et al.

[11] 4,117,307
[45] Sep. 26, 1978

[54] CONTROL SYSTEM FOR CHARGING AND DISCHARGING AN ELECTRIC STORAGE HEATER

[75] Inventors: Poul Christian Carlos Iversen, Nordborg; Flemming Thorsøe, Sonderborg; Børge Bernhard Hanson, Augustenborg, all of Denmark

[73] Assignee: Danfoss A/S, Nordborg, Denmark

[21] Appl. No.: 717,250

[22] Filed: Aug. 24, 1976

[30] Foreign Application Priority Data

Sep. 3, 1975 [DE] Fed. Rep. of Germany ....... 2539165

[51] Int. Cl.² .................... H05B 1/02; F24H 7/04; F24D 11/00
[52] U.S. Cl. .................... 219/364; 165/18; 219/378; 219/491; 219/493; 219/497
[58] Field of Search .............. 219/341, 378, 365, 530, 219/540, 325, 326, 491–493, 497; 126/408; 165/18, 104, 105

[56] References Cited

U.S. PATENT DOCUMENTS

| 3,975,620 | 8/1976 | Hallgreen et al. ............ 219/364 |
| 4,039,773 | 8/1977 | Iversen ....................... 219/497 X |

FOREIGN PATENT DOCUMENTS 2,446,731  4/1976  Fed. Rep. of Germany .......... 219/364

Primary Examiner—A. Bartis
Attorney, Agent, or Firm—Wayne B. Easton

[57] ABSTRACT

A charging apparatus for an electric storage heater includes a resistance heater in series with a low tariff time switch and a charging switch. While the low tariff time switch is closed, usually at night, an integrator controlled by a differential amplifier controls the charging switch in accordance with the total charge accumulated by the integrator which reflects the use of energy during the preceding day. The charge of the integrator at the end of the day is the result of it being intermittently charged and discharged by a voltage divider circuit which has one or more temperature responsive resistances and transmits a voltage to one input of a differential amplifier for the integrator which can be above or below a reference voltage on the other input of the amplifier. The relay of a fan which drives heat from the storage heater may be actuated by an amplifier which has negative and positive feedback means which produces a trigger dead zone for delaying the actuation of the relay for both the starting and the stopping of the fan.

7 Claims, 5 Drawing Figures

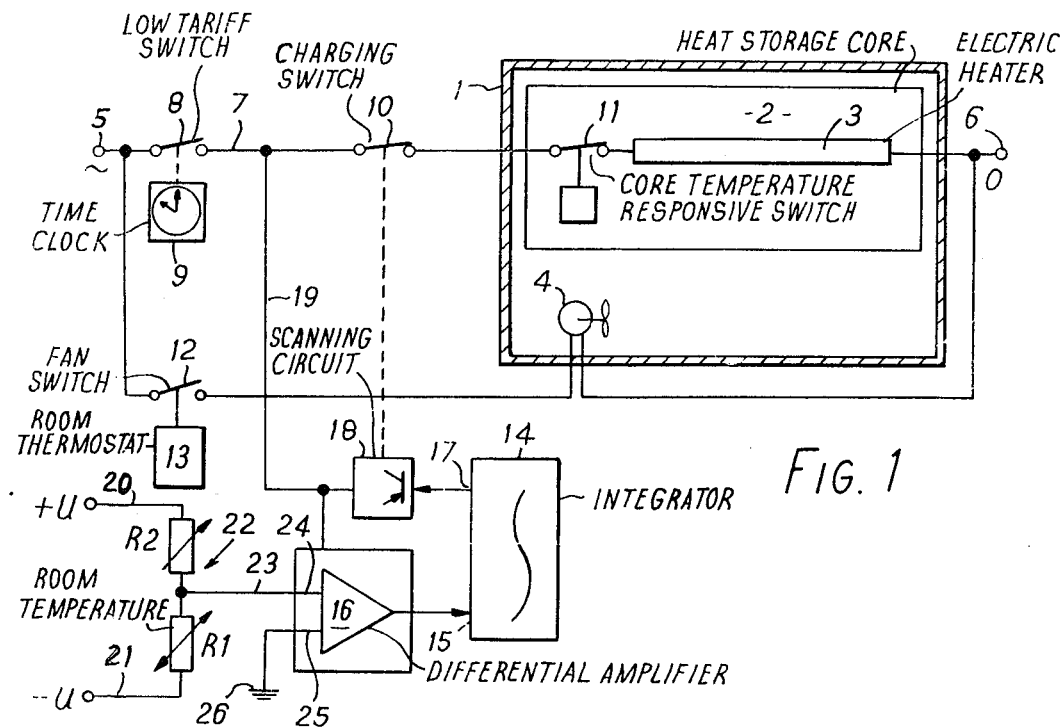
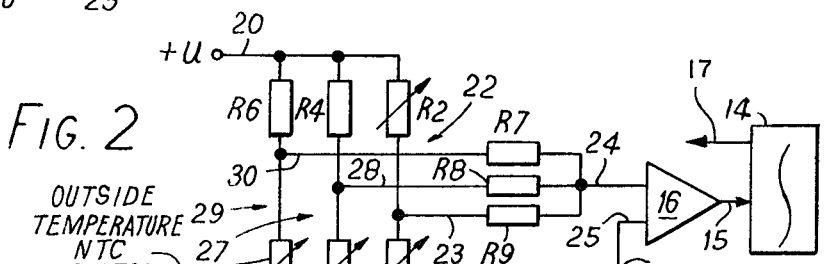
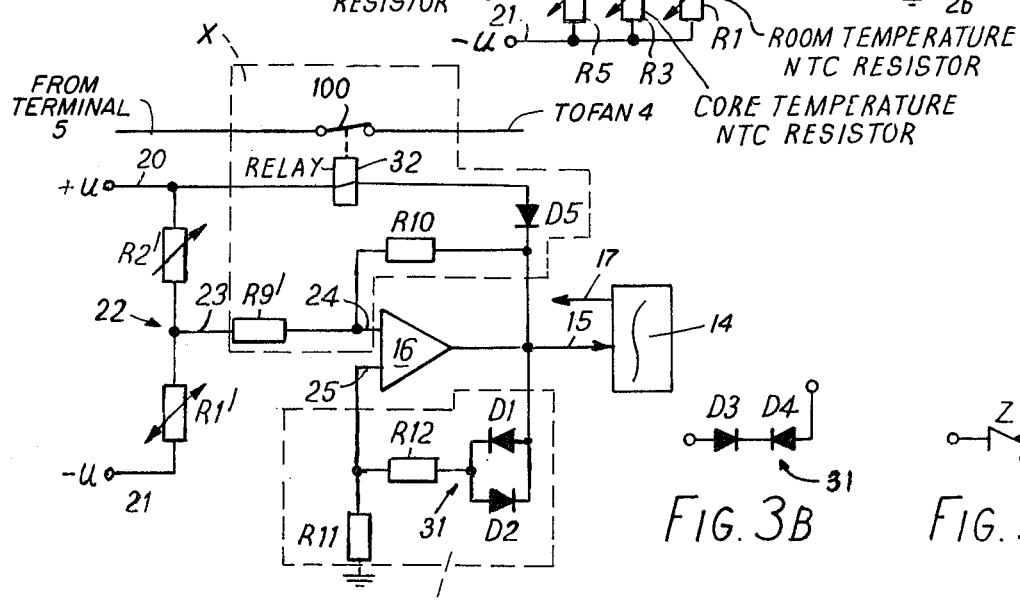

CONTROL SYSTEM FOR CHARGING AND DISCHARGING AN ELECTRIC STORAGE HEATER

The invention relates to a circuit for the charging apparatus of an electric storage heater, comprising an integrator which integrates a signal of one sign when there is a sub-normal temperature in the room and a signal of the opposite sign when there is an excess temperature and the integration value of which is used as a measure for the charging.

A charging apparatus for an electric storage heater has already been suggested, in which discharging takes place by means of a fan and the like that can be switched on and off, the running times for the fan being summated by means of an integrator and the sum being used as a measurement for the charging. Use is made of a room thermostat with three positions and these three positions are utilised as a sub-temperature setting at which the fan is switched on, normal temperature setting at which the fan is switched off, and excess temperature setting of which the on period is subtracted in the integrator from the sum of the running periods of the fan. In this way, account is taken for the next charging of the storage heater not only of the heat requirement to be satisfied during the preceding period but also of any extraneous heat leading to excess temperatures and caused for example by sun rays or overcrowding in the room.

The invention is based on the object of providing a circuit of the aforementioned kind in which the charging period to be determined by the integrator can be even more closely adapted to the actual requirements.

This object is achieved according to the invention in that at least the signal associated with the excess temperature is approximately proportional to the difference between the existing value and the desired value of the temperature.

Although integration of the signal associated with the sub-temperature and the signal associated with the excess temperature is conducted completely identically in the suggested charging apparatus, a very accurate picture is obtained of the heat requirement by reason of a sub-temperature but only an approximate picture of the excess heat recognisable from the excess temperature. This finds its explanation in the fact that the storage heater can counteract a sub-normal temperature by discharging so that the sub-normal temperature occurs only periodically and the running period of, say, a fan switched on during the sub-temperature gives a correct picture of the heat requirement. However, one cannot counteract the excess temperature in this manner. The period of the excess temperature is therefore not an accurate measure of the excess heat. According to the invention, a signal is therefore integrated which has a size corresponding to the excess temperature. The longer the period for which the excess temperature lasted and the larger its size, the less should be the next following charging of the storage heater. Accordingly, whereas sub-temperatures can be immediately rectified by discharging the storage heater, provision can be made in this manner for substantially balancing out excess temperatures during the next following charging period.

In a preferred embodiment, provision is made for the integrator input to be preceded by a differential amplifier of which the first input is connected to the tapping of a room temperature voltage divider comprising a temperature responsive resistance subjected to the room temperature and a settable desired value resistance and disposed between two conductors of different potential, and of which the second input is fed with an intermediate potential lying between these potentials.

With this circuit, a very simple construction ensures that signals that are to be integrated positively or negatively are available at the amplifier output. If the voltage at the tapping of the voltage divider is larger than the mean potential, output signals of one sign occur and if the voltage at the tapping is smaller than the intermediate potential, output signals of the other sign occur. In addition, the signals fed to the differential amplifier are proportional to the departure from the desired value. During integration, account is therefore taken not only of the amount of excess temperature but also of the amount of sub-temperature.

Further, the room temperature voltage divider can be in parallel with a core temperature voltage divider comprising a temperature responsive resistance subjected to the core temperature and a comparator resistance, and that the tappings of both voltage dividers are applied to the first input of the differential amplifier by way of summation resistances. In this way account is taken of the uncontrolled discharge of heat emitted by the storage heater by convection or radiation.

Similarly, the room temperature voltage divider can also be in parallel with an outside temperature voltage divider comprising a temperature responsive resistance subjected to the outside temperature and a comparator resistance, and that the tappings of both voltage dividers are applied to the first input of the differential amplifier by way of summation resistances. A lower outside temperature therefore automatically leads to higher charging.

In all cases, the circuit construction is very simple. The differential amplifier need not be altered. All tappings of the various voltage dividers can simply apply to the first amplifier input through the summation resistances.

The circuit as described can be developed further in that the differential amplifier comprises a feedback to produce a trigger behaviour with a dead zone and that a switching device for a discharging apparatus, e.g. a fan, is controlled from the amplifier output. The switching apparatus is therefore actuated in the same way as a conventional multi-position thermostat, particularly a three-position thermostat.

The switching apparatus can be a relay connected to the amplifier output through a diode. The diode ensures that the relay branch does not act as a disturbing feedback.

The feedback can comprise a negative resistance branch and a positive branch having at least one non-linear element. Somewhat different operating conditions will be obtained depending on the nature of the non-linear element. If the non-linear element is formed by two anti-parallel connected diodes or by two oppositely poled diodes connected in series, increasing signals of the one polarity are fed to the integrator input with an increase in the sub-temperature and increasing signals of the other polarity with an increase in the excess temperature, only the range of the dead zone being left out in which the available signals are less pronounced.

If the non-linear element is formed by a Zener diode, one obtains the behaviour of a two-position thermostat which, with appropriate poling of the Zener diode, delivers analogous signals during excess temperature as well as in that portion of the sub-temperature range lying within the switching difference of the thermostats but delivers constant signals on exceeding the Zener voltage in the sub-temperature range.

The invention will now be described in more detail with reference to the example illustrated in the drawing, in which:

FIG. 1 shows a diagrammatic circuit for the charging apparatus of an electric storge heater;

FIG. 2 illustrates a modification for taking into account a plurality of influencing quantities, and FIG. 3A illustrates a modification for the simultaneous control of the discharging apparatus in which a differential amplifier has an added feedback with a non-linear part to achieve the function of a 3-position thermostat, and FIGS. 3B and 3C show modifications for the nonlinear part of the added feedback of FIG. 3A.

An electric storage heater 1 comprises a storage core 2 which is supplied with heat by means of a heating resistance 3 and from which uncontrolled heat is discharged by radiation and convection and controlled heat by means of a fan 4. The heating resistance is fed from a single phase supply mains of which the phase conductor is connectd to a terminal 5 and the zero conductor to a terminal 6. In the mains conductor leading to the heating resistance 3, there is a low tariff switch 8 which is closed by a time clock 9 during the low tariff periods, a charging switch 10 and an excess temperature switch 11 which is disposed in the core 2 and opens on excess temperature. The fan is switched on with the aid of a thermostatic switch 12 of which the senser 13 is subjected to the room temperature. To control the charging period, an integrator 14 is connected by an input 15 to the output of a differential amplifier 16 and by an output 17 to a scanning circuit 18. A control conductor 19 ensures that the differential amplifier 16 is effective when the low tariff switch 8 is open and that the scanning circuit 18 is effective when the switch 8 is closed. The signals fed to the input 15 are integrated in the integrator 14 and form an integration value which represents a measure of the desired charging. It can be resolved by a constant or by a variable scanning quantity, the charging switch 10 being actuated at the instant of complete resolution. The integrator 14 can be a condenser or a secondary element but is preferably an electrolytic element in which a solid electrolyte with high ion conductivity, e.g. a silver halogenide compound, is disposed between an electrode of active material, e.g. silver, and an electrode of relatively inactive material, e.g. gold. Between a first conductor 20 applied to the voltage $+U$ and a second conductor 21 applied to the voltage $-U$, there is a voltage divider 22 consisting of a temperature responsive resistance R1 subjected to the room temperature and a settable desired value resistance R2. The tapping 23 is connected to the first input 24 of the differential amplifier 16. Its second input 25 is applied to earth 26 having zero potential. If the temperature responsive resistance R1 is an NTC resistance and the room temperature rises from sub-temperature to excess temperature, the potential at the input 24 drops. If there is a fall below earth potential, the analogous signal at the amplifier output changes its sign.

FIG. 2 shows that the differential amplifier 16 can take still further influences into account. Apart from the room temperature voltage divider 22 there is a core temperature voltage divider 27 consisting of a temperature responsive resistance R3 subjected to the core temperature and a comparator resistance R4 having a tapping 28, as well as an outside temperature voltage divider 29 consisting of a temperature responsive resistance R5 subjected to the outside temperature and a comparator resistance R6 having a tapping 30. The three tappings 23, 28 and 30 are connected to the input 24 by way of summation resistances R7, R8 and R9.

The embodiment of FIG. 3A is the same as that of FIG. 1 except for the addition of components to the inputs of the differential amplifier 16 and the elimination of the room thermostatic switch 12 and sensor 13. The added input components are designated by their enclosure in areas bounded by broken lines and identified as X and Y in FIG. 3A.

In FIG. 3A, the differential amplifier 16 is provided with a negative feedback consisting of the two resistances R9 and R10 as well as with a positive feedback consisting of the resistances R11, R12 and a non-linear element 31. In the embodiment of FIG. 3A, this non-linear element consists of two anti-parallel connected diodes D1 and D2 and in the embodiment of FIG. 3B of two oppositely poled diodes D3 and D4 connected in series and in the embodiment of FIG. 3C of a Zener diode Z. In addition, the amplifier output is connected by way of a diode D5 and a relay 32 to the conductor 20 supplying the voltage $+U$ for the purpose of actuating the switch 100.

In the variation of FIG. 3A, the function of a three-position thermostat is obtained because the amplifier 16 has a trigger behaviour with a dead zone as a result of the two feedbacks. Analogue signals of the one sign are fed to the integrator input 15 during sub-temperature and analogue signals of the other sign during excess temperature. Within the dead zone the signals depend on the nature of the last triggering; they are less pronounced. The switch 100 closes when the dead zone is passed in a direction towards sub-temperature to energize fan 4 and opens when the dead zone is passed in the direction of excess temperature. Similar conditions apply in the variation of FIG. 3B.

In the FIG. 3C embodiment, it must be borne in mind that the Zener diode Z does not exhibit a symmetrical behaviour. Here one can ensure that analogue signals are available in the excess temperature range but that a constant signal is fed to the integrator in the sub-temperature range.

In the present embodiment, charging starts on commencement of the low tariff period and ends when the integrator 14 has reached its rest position. It is, however, also possible to select the input signals for the amplifier 16 such that the integrator 14 must first of all be scanned before the charging switch 10 is closed, whereupon charging takes place up to the end of the low tariff period.

The intermediate potential need not be exactly halfway between the potentials of the two conductors 20 and 21 but may also deviate from this mean value; other values may then possibly have to be selected for the resistances R1 to R6.

We claim:

1. Charging apparatus for an electric storage heater comprising a heat storage core, a resistance heater for heating said core in series with a clock operated time switch and a charging switch, an integrator, means responsive to the output of said integrator for opening and closing said charging switch below and above respectively a predetermined potential output value of said integrator when said time switch is closed, analog sensing means for sensing at least one environment temperature value and outputting a potential which corresponds quantitatively to said value, differential amplifier means driven by said analog sensing means for charging or discharging said integrator in quantitative correspondence to said value when said time switch is open, said differential amplifier means having first and second inputs, said sensing means including a room temperature voltage divider which includes a temperature responsive resistance and is between conductors of different potentials, said sensing means having the tapping thereof connected to said first differential amplifier means input, said second differential amplifier means input being connected to a potential which falls between said different potentials.

2. A charging appratus for an electric storage heater according to claim 1 wherein said sensing means further includes outdoor temperature and core temperature voltage dividers having temperature responsive resistances and being in parallel with said room temperature voltage divider with all three tappings being connected said first amplifier input.

3. Charging apparatus for an electric storage heater according to claim 1 including fan means for driving heat from said storage heater, relay means for operating said fan means connected to the output of said differential amplifier means, negative and positive feedback means for said differential amplifier means to produce a trigger dead zone to delay the actuation of said relay means for both the starting and stopping of said fan.

4. Charging apparatus for an electric storage heater according to claim 3 wherein said positive feedback means includes nonlinear means.

5. Charging apparatus for an electric storage heater according to claim 4 wherein said nonlinear means comprises two anti-parallel connected diodes.

6. Charging apparatus for an electric storage heater according to claim 4 wherein said nonlinear means includes two oppositely poled diodes connectd in series.

7. Charging apparatus for an electric storage heater according to claim 4 wherein said nonlinear means includes a Zener diode.

* * * * *